United States Patent
Emori et al.

(10) Patent No.: US 8,706,487 B2
(45) Date of Patent: Apr. 22, 2014

(54) AUDIO RECOGNITION APPARATUS AND SPEECH RECOGNITION METHOD USING ACOUSTIC MODELS AND LANGUAGE MODELS

(75) Inventors: Tadashi Emori, Tokyo (JP); Yoshifumi Onishi, Tokyo (JP)

(73) Assignee: NEC Corporation, Tokyo (JP)

( * ) Notice: Subject to any disclaimer, the term of this patent is extended or adjusted under 35 U.S.C. 154(b) by 1095 days.

(21) Appl. No.: 12/518,075

(22) PCT Filed: Dec. 7, 2007

(86) PCT No.: PCT/JP2007/073674
§ 371 (c)(1),
(2), (4) Date: Jun. 5, 2009

(87) PCT Pub. No.: WO2008/069308
PCT Pub. Date: Jun. 12, 2008

(65) Prior Publication Data
US 2010/0324897 A1    Dec. 23, 2010

(30) Foreign Application Priority Data
Dec. 8, 2006    (JP) .................................. 2006-331871

(51) Int. Cl.
*G10L 15/06*    (2013.01)
(52) U.S. Cl.
USPC ......................................................... 704/243
(58) Field of Classification Search
USPC ......................................................... 704/243
See application file for complete search history.

(56) References Cited

U.S. PATENT DOCUMENTS

| | | | |
|---|---|---|---|
| 5,444,817 A * | 8/1995 | Takizawa | 704/254 |
| 5,583,961 A * | 12/1996 | Pawlewski et al. | 704/241 |
| 5,774,851 A | 6/1998 | Miyashiba et al. | |
| 5,893,059 A * | 4/1999 | Raman | 704/256.2 |
| 6,014,624 A * | 1/2000 | Raman | 704/243 |
| 2002/0087309 A1 | 7/2002 | Lee et al. | |

(Continued)

FOREIGN PATENT DOCUMENTS

| | | |
|---|---|---|
| EP | 1 189 202 A1 | 3/2002 |
| JP | 62-039900 | 2/1987 |

(Continued)

OTHER PUBLICATIONS

H. Fujimura et al., "Evaluation of an acoustic modeling based on an SNR criterion under real driving conditions," IEICE Technical Report, Jan. 21, 2005, vol. 104:631, SP2004-152, pp. 43-48.

(Continued)

*Primary Examiner* — Michael N Opsasnick
(74) *Attorney, Agent, or Firm* — Foley & Lardner LLP (57) ABSTRACT

Acoustic models and language models are learned according to a speaking length which indicates a length of a speaking section in speech data, and speech recognition process is implemented by using the learned acoustic models and language models. A speech recognition apparatus includes means (103) for detecting a speaking section in speech data (101) and for generating a section information which indicates the detected speaking section, means (104) for recognizing a data part corresponding to a section information in the speech data as well as text data (102) written from the speech data and for classifying the data part based on a speaking length thereof, and means (106) for learning acoustic models and language models (107) by using the classified data part (105).

17 Claims, 5 Drawing Sheets

(56) References Cited

U.S. PATENT DOCUMENTS

| | | | |
|---|---|---|---|
| 2006/0020473 A1* | 1/2006 | Hiroe et al. | 704/275 |
| 2006/0149544 A1* | 7/2006 | Hakkani-Tur et al. | 704/236 |
| 2007/0225982 A1* | 9/2007 | Washio | 704/257 |

FOREIGN PATENT DOCUMENTS

| | | |
|---|---|---|
| JP | 2829014 | 9/1998 |
| JP | 11-024693 | 1/1999 |
| JP | 2000-099077 A | 4/2000 |
| JP | 2002-297372 A | 10/2002 |
| JP | 2003-224774 A | 8/2003 |
| JP | 2003-330485 A | 11/2003 |
| JP | 2004-126143 A | 4/2004 |
| JP | 2007-249051 A | 9/2007 |
| WO | WO 01/26092 A2 | 4/2001 |

OTHER PUBLICATIONS

T. Shinozaki et al., "Hidden Mode HMM Using Bayesian Network for Modeling Speaking Rate Fluctuation,"Automatic Speech Recognition and Understanding (ASRU) workshop, 2003, pp. 417-422.

M. Nishida et al., "Unsupervised Speaker Indexing Using Speaker Model Selection Based on Bayesian Information Criterion," The Transactions of the Institute of Electronics, Information and Communication Engineers D-11, Feb. 1, 2004, vol. J87-D-II:2, pp. 504-512.

Kita, Language models and calculation 4:stochastic language models., University of Tokyo Press, 1999, pp. 57-62.

I. Kudo et al., "The Voice Across Japan Database," The Transaction of the Institute of Electronics, Information and Communication Engineers, Sep. 15, 1999, vol. 40:9, pp. 3432-3445.

S. Young et al., "The HTK Book (for HTK Version 3.3)," Cambridge University Engineering Department, Apr. 2005, pp. 35-40; 54-64; and 127-130.

* cited by examiner

AUDIO RECOGNITION APPARATUS AND SPEECH RECOGNITION METHOD USING ACOUSTIC MODELS AND LANGUAGE MODELS

This application is the National Phase of PCT/JP2007/073674, filed Dec. 7, 2007, which claims priority to Japanese Application No. 2006-331871, filed Dec. 8, 2006, the disclosures of which are hereby incorporated by reference in their entirety.

TECHNICAL FIELD

The present invention relates to a speech recognition technique, and in particular to a speech recognition technique using acoustic models and language models and a learning technique of the models.

BACKGROUND ART

In recent years, study of speech recognition of a spoken language is carried on vigorously. It is difficult to recognize a spoken language at high precision because of various causes such as acoustic vagueness like speaking idleness and diversity of word arrangement. As a technique for improving the recognition precision of the spoken language, a technique for utilizing a phenomenon grasped from the spoken language is proposed. As an example thereof, a technique obtained by paying attention to speaking rate as described in Non Patent Literature 1 described later can be mentioned.

Unlike mechanical read aloud speaking or word speaking, a spoken language of human being is rarely vocalized at a constant speaking rate. Therefore, the rate of the spoken language largely fluctuates during speaking. Especially when the speaking rate is fast, it is difficult for the mouth movement to follow the speaking and deformation occurs in voice. It is considered that such deformation largely affects the degradation of the recognition precision.

A technique for using dedicated acoustic models learned for a voice having a fast speaking rate by using only a voice having a fast speaking rate or using a dictionary having speaking deformations registered therein is described in Non Patent Literature 1. The technique described in Non Patent Literature 1 attempts to improve the recognition performance by using models dedicated for speaking rate.

CITATION LIST

Non Patent Literature

{NPL 1} Takahiro Shinozaki, Sadaoki Furui, "HIDDEN MODE HMM USING BAYESIAN NETWORK FOR MODELING SPEAKING RATE FLUCTUATION," Automatic Speech Recognition and Understanding (ASRU) workshop 2003, pp. 417-422
{NPL 2} Kita, "Language models and calculation 4: stochastic language models," University of Tokyo Press, 1999, pp. 57-62
{NPL 2} Steve Young et al., "The HTK Book (for HTK Version 3.3)," Cambridge University Engineering Department, Apr. 2005, pp. 35-40, pp. 54-64 and pp. 127-130

SUMMARY OF INVENTION

Technical Problem

By the way, the above-described speaking rate is a feature measured based on contents of speaking. In speech recognition process, speaking contents are presumed by using a recognition result of input speech data. Since there is a possibility that the recognition result will include an error, however, the speaking rate obtained from such a recognition result lacks precision. Therefore, the technique for learning models by using the speaking rate and implementing speech recognition has a problem that it is difficult to improve the recognition precision. Furthermore, if the recognition result on the basis of which the speaking rate has been measured actually includes an error, there may occur the degradation of the recognition precision.

The above-described problems are caused by using a feature quantity which is difficult to measure accurately like the speaking rate as a feature quantity which indicates a phenomenon of spoken language. In the speech recognition method for using a feature quantity of this kind, the recognition precision is improved remarkably under an ideal condition that a right answer of the feature quantity is already known. In an actual scene, however, the right answer is not known and consequently it is difficult to improve the recognition precision. Originally, the speaking rate is an acoustic feature. Speaking contents which are a linguistic feature are not concerned with a change of the speaking rate. Therefore, the range of improvement of speech recognition using the speaking rate is restricted to the acoustic feature. As a result, it is considered that the absolute value of the improvement is not large.

The present invention has been made in view of the problems, and an object thereof is to provide a speech recognition technique for recognizing a speech from which an accurate feature quantity is hard to grasp, like spoken language with higher precision.

Solution to Problem

A speech recognition apparatus according to the present invention includes a speech recognition unit implementing a speech recognition process by using acoustic models and language models, and a model learning unit learning the acoustic models and the language models according to a speaking length which indicates a length of a speech section in speech data.

Advantageous Effects of Invention

According to the present invention, recognition precision of speech from which an accurate feature quantity is hard to grasp like spoken language can be raised in the speech recognition process.

REFERENCE SIGNS LIST

100 Speech recognition apparatus
100A, 100A_1, 100A_2 Model learning unit 100B, 100B_1, 100B_2 Speech recognition unit
101 Speech data
102 Written text data
103 Section detection means
104 Data selection means
105 Speaking length classified data
106 Model learning means
107 Speaking length classified models
201 Speaking length decision means
202, 401 Model selection means
203 Recognition means
301 Speaking time decision means
302 Speaking length speaking time classified data
303 Speaking length speaking time classified models {Description of Embodiments}

Figure 5:
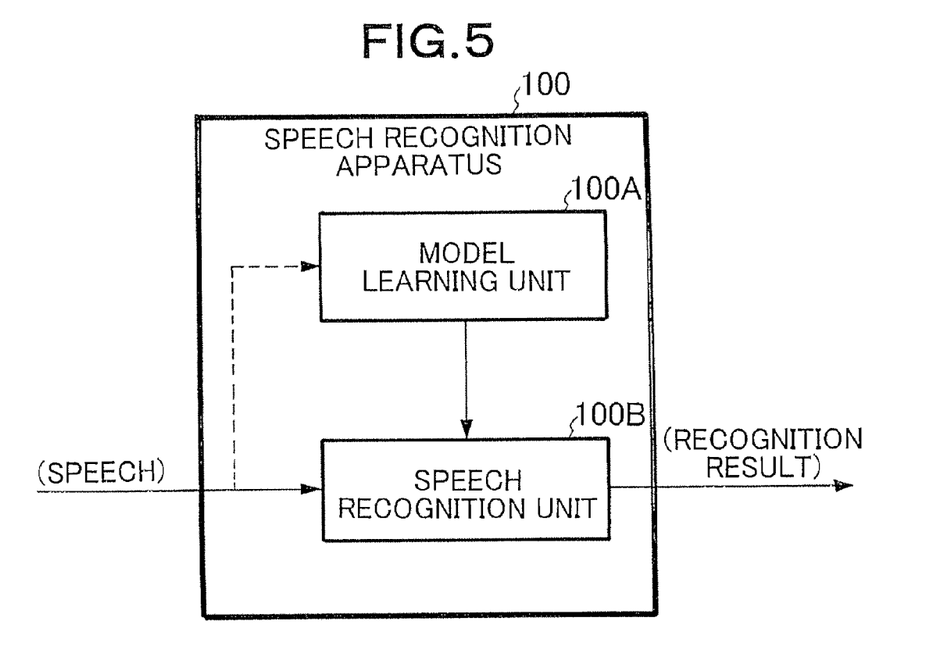
{FIG. 5} A block diagram shows a speech recognition apparatus according to an embodiment of the present invention.

FIG. 5 shows a configuration of a speech recognition apparatus according to an embodiment of the present invention. A speech recognition apparatus 100 includes a model learning unit 100A implementing learning process of models to be used in speech recognition, and a speech recognition unit 100B implementing recognition process of input speech and outputting a result of the recognition. By the way, the illustrated configuration is common to the first and second embodiments which will be described later.

Figure 1:
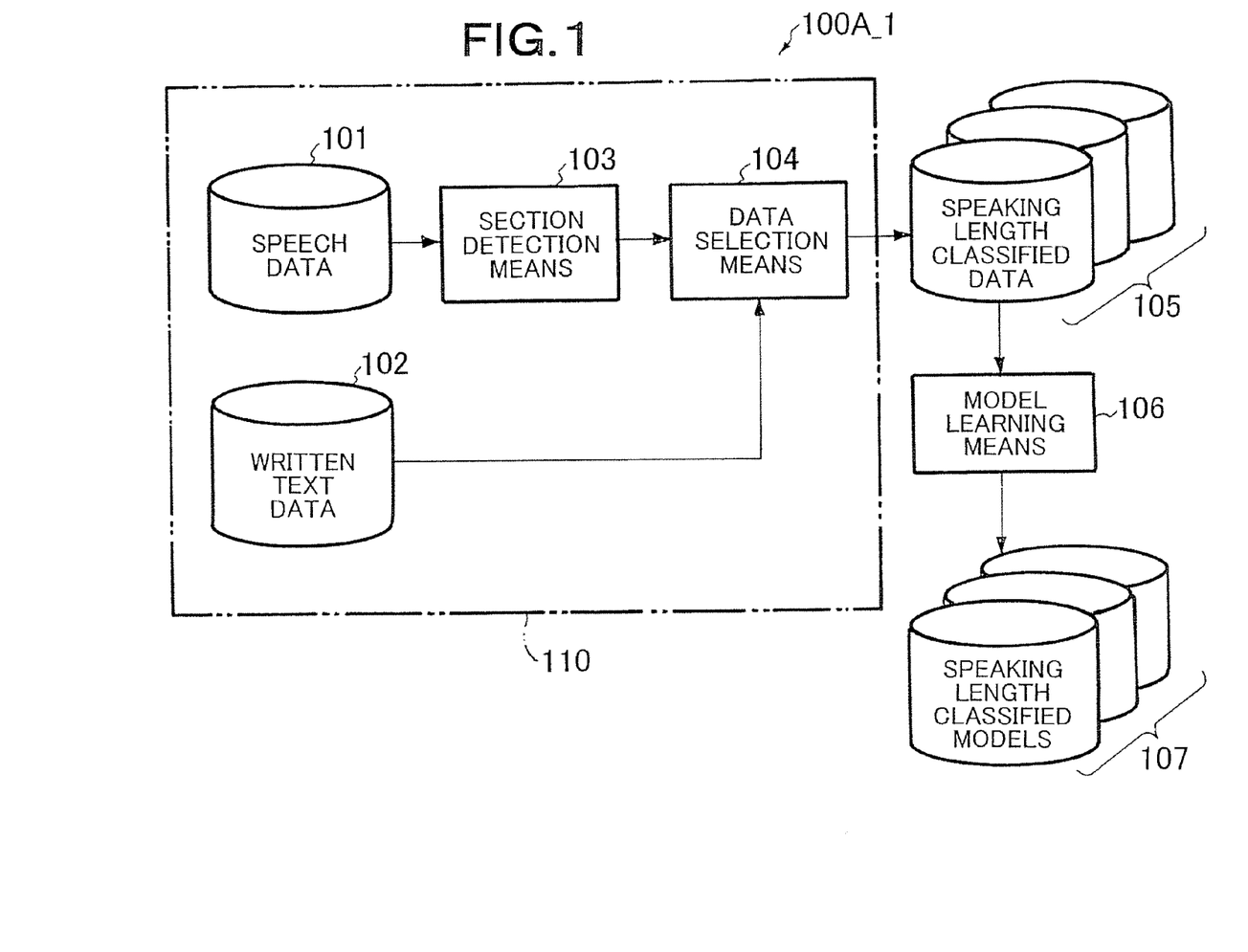
{FIG. 1} A block diagram shows a model learning unit in a first embodiment of the present invention.

FIG. 1 shows a configuration of a model learning unit 100A_1 in a first embodiment. The model learning unit 100A_1 includes speech data 101, written text data 102, section detection means 103, data selection means 104, speaking length classified data 105, model learning means 106, and speaking length classified models 107. A common element 110 surrounded by a chain line in FIG. 1 is a component common to the present embodiment and the second embodiment which will be described later.

The speech data 101 is data for learning acoustic models. For example, the speech data 101 is data obtained by using a sampling frequency of 44.1 kHz and performing A/D conversion with 16 bits per sample. Since the speech data 101 includes all sounds grasped during conversation, the speech data 101 includes a mixture of sections in which speech is spoken and sections of no sound or noise other than speaking.

A person listens to the speech data 101 and writes its contents. The written text data 102 is text data thus obtained.

The section detection means 103 analyzes the speech data 101 input thereto, detects a speech section, and outputs it as speech section information. As for the speech section detection method, for example, a method for calculating speech power and regarding a section over which power exceeds a certain threshold as a speech section can be used. The speech power is a value obtained by adding up amplitude square of speech data at constant intervals of, for example, approximately 10 msec. Here, a simple method has been mentioned as the speech section detection method. However, a different method may also be used as long as it is a method for detecting a speech detection.

The data selection means 104 cuts out speech data according to the speech section detected by the section detection means 103, selects the written text data 102 corresponding to the section, and outputs the selected written text data 102. At that time, data parts cut out from the speech data and the written text are classified by the length of the speech section, i.e., the speaking length, and stored in a storage device. Units of classification in the present embodiment are three units, i.e., "short speaking", "long speaking" and "medium speaking." The speaking length classified data 105 are speech data and written texts classified into these three units.

As regards the classification of the speaking length, the above-described three units will now be described. The "short speaking" corresponds to speaking formed of one or two words such as an answer to a question of the other party or an agreeable response. Its vocabulary is formed of words which indicate responses such as "Yes" and "Well, . . . " and words of answers to questions. It is considered that in general such speaking lasts approximately one second. In the present embodiment, therefore, the speaking length of "short speaking" is defined to be less than one second. The "medium speaking" corresponds to, for example, a fixed form of composition such as "Thank you." or a concise question such as "Where were you on Jan. 1st?" which has been put in order in a speaker's mind. In the present embodiment, the speaking length of such "medium speaking" is defined as approximately one to three seconds. The "long speaking" corresponds to explanation concerning a certain event or explanation of matters which are not put in order in the head. In the present embodiment, the speaking length of the "long speaking" is defines as at least three seconds.

The model learning means 106 learns acoustic models and language models to be used for speech recognition according to the above-described classification, by using the speaking length classified data 105. The speaking length classified models 107 are acoustic models and language models learned according to classes of speaking length.

Language models and a learning method for them will now be described. The language models are models indicated by approximation using N-gram as described in Non Patent Literature 2, and their learning method mainly depends upon the maximum likelihood estimation. The N-gram is a modeling technique for language models. It is a technique for approximating occurrence probabilities of all words by using an occurrence probability (conditional probability) of an Nth word on condition of N-1 words in the history.

According to the maximum likelihood estimation, the occurrence probability can be calculated by counting the frequency of a word string in a learning corpus. For example, an occurrence probability of a word string of a two-word chain formed of "I" and "am" is equivalent to a value obtained by dividing the number of occurrences of "I" and "am" by the total number of the two-word chains. In the case of speech recognition, a conditional probability is used in the decoding process. As regards the conditional probability, for example, P(am/I) indicates a probability that "am" will occur after "I." The P(am/I) can be calculated as P(am/I)=P(I, am)P(I) by using a joint probability P(I, am) that two words of "I" and "am" will occur consecutively and a probability P(I) that "I" will occur.

On the other hand, the acoustic models are stochastic models indicating acoustic features of speech. As the acoustic models, the HMM (Hidden Markov Model) having triphones with phonemes contexts located before and after taken into consideration, as phonemes and written in Non Patent Literature 3 which is a manual of a tool kit of the HMM, pp. 35-40 is widely used. Hereafter, learning of the acoustic models will be described.

As described in Non Patent Literature 3 pp. 54-64, acoustic features of speech are extracted by cutting out speech data over a definite section of approximately 10 msec, implementing process such as pre-emphasis, FFT and filter bank on the speech data thus cut out, and then performing cosine transform. By the way, in addition to the extracted features, power or a difference between preceding time and succeeding time may also be used.

Subsequently, a forward backward probability described in Non Patent Literature 3 pp. 127-130 is obtained by using label data which is obtained by using the extracted features and written text corresponding to the extracted features. As a result, the features are associated with the label data. Here, the above-described tri-phone or the like is conceivable as the label data. For example, if speech is written as "watakushi", label data becomes "*–w+a w–a+t a–t+a t–a+k a–k+u k–u+s s–i+*".

The model learning means 106 learns acoustic models and language models with the process described above as regard each of the three classes of the speaking length. In the case of the above-described example, models of three kinds: models for the "short speaking" having a speaking length of one second or less, models for the "medium speaking" having a speaking length between one second and three seconds, and models for the "long speaking" having a speaking length of at least three seconds are learned. Those learned acoustic models and language models are the speaking length classified models 107.

Figure 2:
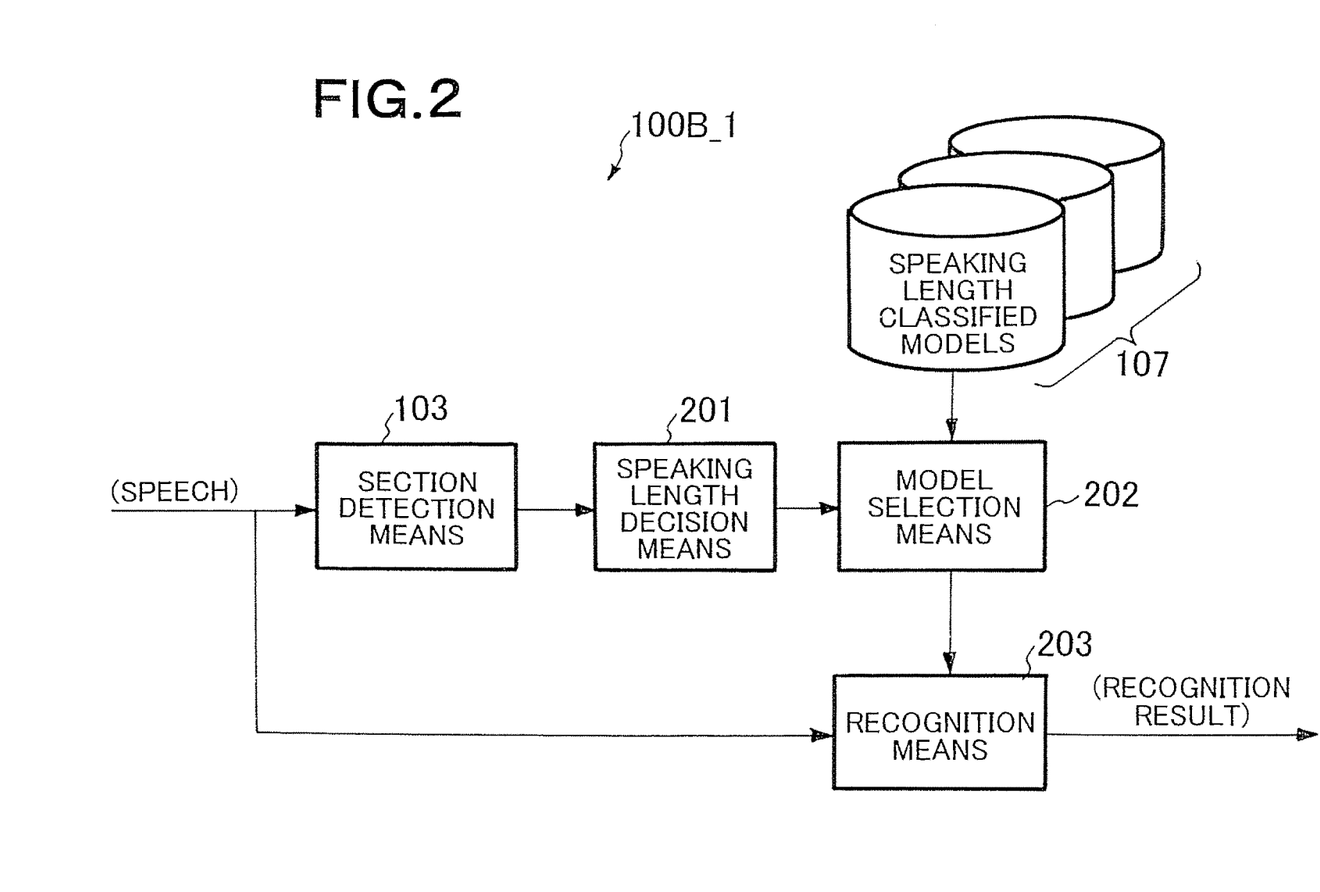
{FIG. 2} A block diagram shows a speech recognition unit in the first embodiment of the present invention.

FIG. 2 shows a configuration of a speech recognition unit 100B_1 in a first embodiment. The speech recognition unit 100B_1 includes section detection means 103, speaking length decision means 201, speaking length classified models 107, model selection means 202 and recognition means 203

The section detection means 103 has a function which is basically the same as the function of the section detection means 103 in the model learning unit 100A_1. The section detection means 103 detects a speech section from speech data which is input, and outputs start time and end time of the speech section as section information.

The speaking length decision means 201 calculates the speaking length which is the length of the section based on the section information. And the speaking length decision means 201 makes a decision which of prescribed classes such as "one second or less", "between one second and three seconds", and "at least three seconds" described above corresponds to the calculated speaking length.

The model selection means 202 selects acoustic models and language models corresponding to the class of speaking length judged by the speaking length decision means 201, from the speaking length classified models 107 described above.

The recognition means 203 implements recognition of the input speech by using the acoustic models and language models selected by the model selection means 202, and outputs a result of the recognition. A method for recognition is broadly divided into acoustic analysis process and search process. The acoustic analysis is process for calculating the above-described feature quantity of the speech. The search is process for calculating a score of a word by using the calculated feature quantity and the acoustic models and language models and outputting a word having a high score as a recognition candidate.

Thus, according to the first embodiment, acoustic models and language models are learned for each speaking length serving as a feature quantity of speech, and speech recognition is implemented by using the models. Therefore, the precision of the speech recognition can be improved.

In general, in spoken language, a different phenomenon is seen according to its speaking length. For example, "short speaking" and "medium speaking" have contents previously put in order in a speaker's mind, such as "Yes." or "Thank you.", and consequently their speaking is comparatively clear and accurate. On the other hand, in the case of "long speaking," speaking is implemented while the person is thinking. Therefore, a filler such as "Well, . . . " is inserted in the middle or the speaking person stammers. In this way, a phenomenon that speaking becomes vague is seen in the "long speaking." Comparing "short speaking" in which one word or two words are spoken with "medium speaking" in which more words are spoken, the possibility that idleness will occur in the mouth movement is high in the "medium speaking" because it is attempted to speak more words.

Considering such a phenomenon, it is considered that there is great correlation between the speaking length and a phenomenon seen in the speaking. Therefore, speech recognition with high precision is made possible by learning acoustic models and language models according to the speaking length and implementing speech recognition with the learned models in the present embodiment. Furthermore, information which does not directly concern the contents of speaking, such as power information, is used in calculation of the speaking length, it is not necessary to grasp the speaking contents beforehand. Therefore, it is possible to easily construct a stable speech recognition system having the same precision at the time of learning and the time of recognition.

Besides generation of learning models classified into acoustics and language as in the present embodiment, the models for learning may also be indicated by, for example, a conditional probability having a speaking length as a condition. Furthermore, in the case where the speaking length is, for example, three seconds at the time of speech recognition, a linear sum of a model having a speaking length of two seconds and a model having a speaking length of four seconds may also be used instead of using only the model of three seconds.

A second embodiment of the present invention will now be described. In the present embodiment, model learning and speech recognition are implemented with attention paid to not only the above-described speaking length but also speaking time which is time measured from the head of the speech section as the feature quantity of speech.

Figure 3:
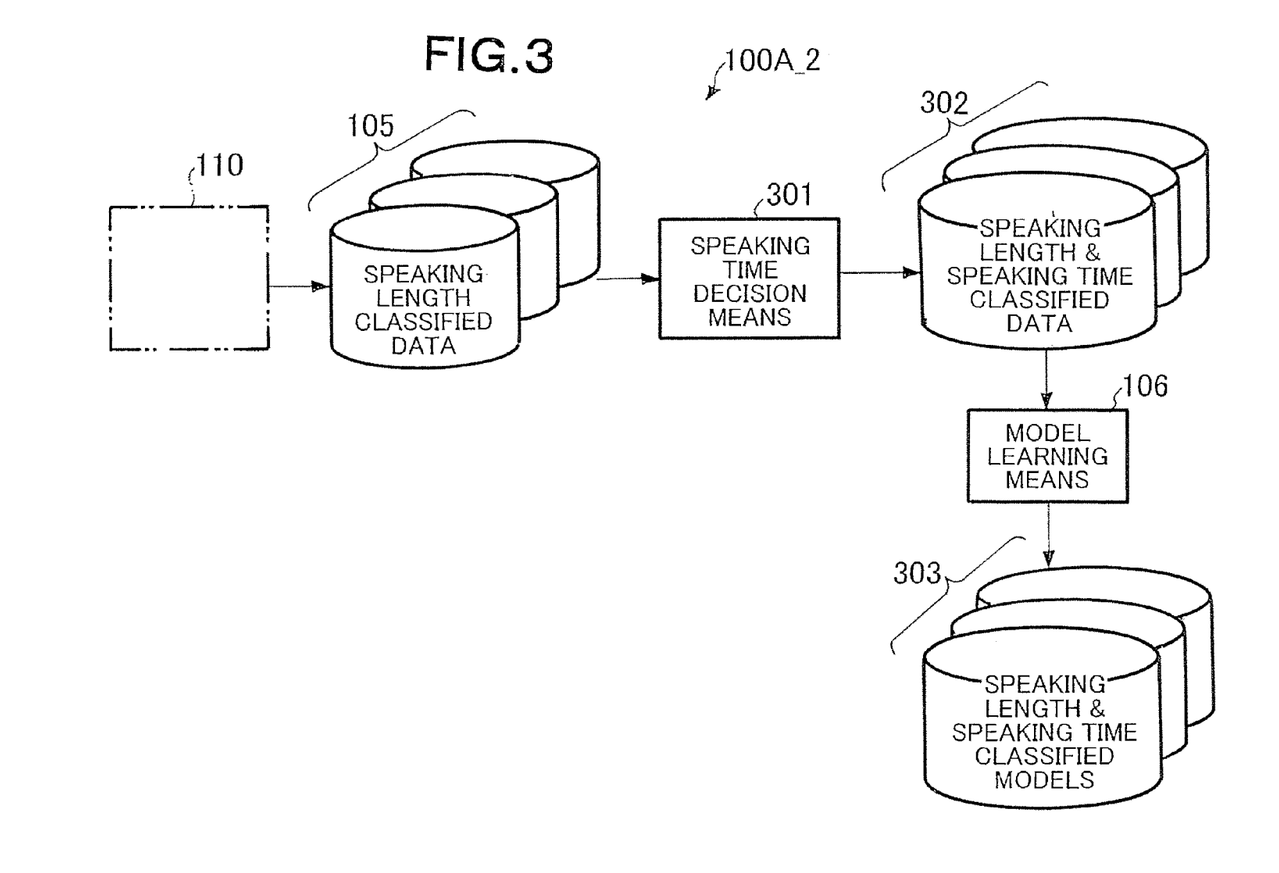
{FIG. 3} A block diagram shows a model learning unit in a second embodiment of the present invention.

FIG. 3 shows a configuration of a model learning unit in the second embodiment. A model learning unit 100A_2 in this embodiment includes speaking length classified data 105 obtained from the above-described common element 110 shown in FIG. 1, speaking time decision means 301, speaking length & speaking time classified data 302, the model learning means 106, and speaking length & speaking time classified models 303.

The speaking time decision means 301 further classifies speech data and written data in the speaking length classified data 105 classified by speaking length into three parts: a part of one second from the head, a part of the last one second, and remaining central part. The classified parts correspond to detailed data parts in the present invention. The number of classes is not limited to three as in the present embodiment, but may be another number such as four or five. Furthermore, a combination of a plurality of parts, such as a combination of one second head part and one second end part, may be defined as one class.

The speaking length & speaking time classified data 302 are obtained by classifying the speech data and written text classified by the speaking time decision means 301 according to the speaking length and speaking time. The model learning means 106 learns acoustic models and language models according to the speaking length and the speaking time by using the speaking length & speaking time classified data 302. The learned acoustic models and language models are the speaking length & speaking time classified models 303.

Figure 4:
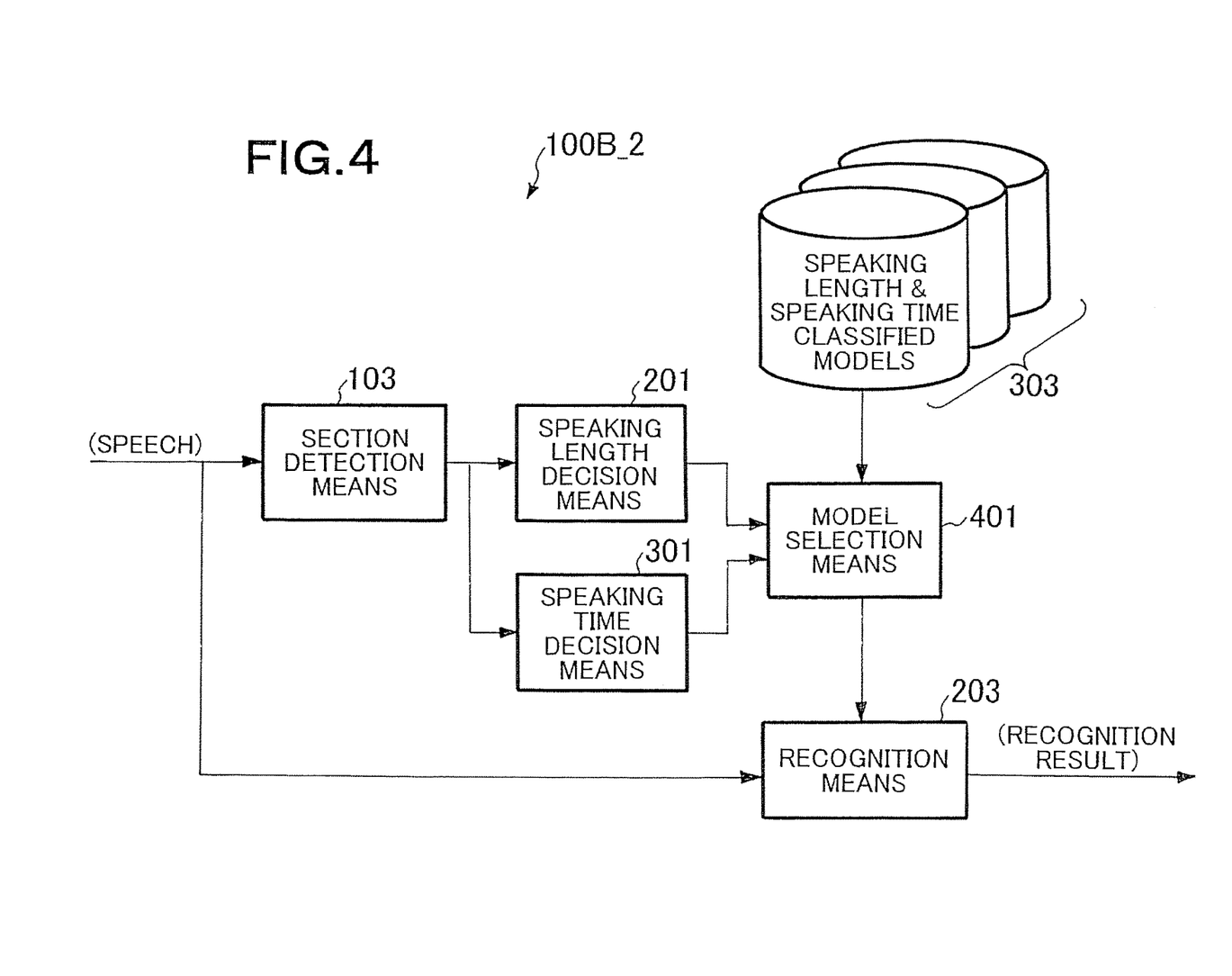
{FIG. 4} A block diagram shows a speech recognition unit in the second embodiment of the present invention.

FIG. 4 shows a configuration of a speech recognition unit 100B_2 according to the present embodiment. The speech recognition unit 100B_2 includes the section detection means 103, the speaking length decision means 201, the speaking time decision means 301, the speaking length & speaking time classified models 303, model selection means 401, and the recognition means 203.

The section detection means 103 and the speaking length decision means 201 are the same as those in the above-described speech recognition unit 100B_1 shown in FIG. 2. In other words, the section detection means 103 detects a speech section from input speech data and the speaking length decision means 201 makes a decision which unit correspond to the section length, that is, the speaking length. The speaking time decision means 301 recognizes three parts based on the section information: a one-second part beginning with the head of the input speech, one-second end part, and a remaining central part.

The model selection means 401 selects acoustic models and language models corresponding to speech data of a recognition object from the speaking length & speaking time classified models 303 based on information of the speaking length and speaking time. For example, if in model selection the speech waveform to be recognized lasts less than one second and the waveform of one second from the head is to be recognized, then models in which the speaking length of speech data used at the time of learning is less than one second and the speaking time is within one second are selected.

According to the second embodiment, speech recognition with higher precision is made possible by tinging the speaking length with the speaking time.

The property of speaking time classified vocabulary in the spoken language is considered as follows. Words spoken until one second lapses from the head of one speech section tend to frequently include a response such as "Yes." and a filler word such as "Well, . . . ". As for words spoken in the final part of the section, a composition end expression such as " . . . desu." or " . . . deshita." is frequently used according to the nature of Japanese.

Considering such a property, it is considered that the recognition performance is improved by generating acoustic models and language models for each speaking time, and using dedicated models according to speaking time observed from the input speech to implement speech recognition. By tinging the speaking length with the speaking time, narrowing down the start part of the recognized section to vocabulary such as "yes" or "well" and narrowing down the end part of the section to the composition end expression such as " . . . desu.", the process can be made efficient.

Furthermore, the speaking time serving as a feature quantity of speech is information obtained by measuring time from the head of the decided speaking length. Therefore, the speaking time is information which is not directly concerned in speaking contents in the same way as the speaking length. The speaking time is not information in which a difference is caused in observed value between the time of learning and the time of recognition. As a result, stable speech recognition can be implemented.

By the way, the model for learning using the speaking time may be indicated by a conditional probability having the speaking length and the speaking time as conditions. Furthermore, at the time of speech recognition, a weighted linear sum with a model of adjacent speaking length and speaking time or with another model may also be used instead of the model selected based on the speaking length and speaking time.

In the above-described embodiments, the speaking length is classified into three classes: "short speaking," "long speaking" and "medium speaking." In embodying the present invention, however, the speaking length may be two classes or at least four classes. In the case of two classes, however, classification is coarse and consequently it is difficult to improve the recognition precision and the process is complicated as the number of classes is increased. Therefore, it is desirable to set the number of classes for the speaking length with due regard to tradeoff between them.

{Industrial Applicability}

The present is suitable for various speech recognition apparatuses which need high precision speech recognition. The present invention may be embodied as a computer program corresponding to means included in a speech recognition apparatus according to each of the above-described embodiments.

The invention claimed is:

1. A speech recognition apparatus comprising:
a speech recogaition unit implementing a speech recognition process by using acoustic models about a set of phonemes and language models about a chain probability of a word group consisting of the set of phonemes; and
a model learning unit
that (1) classifies speaking section included in speech data according to lengths of the speaking sections, (2) classifies detailed data parts corresponding to predetermined parts in each of the classified speaking sections according to start time of the predetermined parts, and (3) learns the acoustic models and the language models by using the classified detailed data parts specified both of the lengths of the speaking sections and the start time of the predetermined parts.

2. The speech recognition apparatus according to claim 1, wherein the model learning unit comprises:
means for detecting the speaking section in speech data and for generating a section information which indicates the detected speaking section;
means for recognizing a data part corresponding to a section information in the speech data as well as text data written from the speech data and for classifying the recognized data part based on a speaking length thereof; and
means for learning acoustic models by using the classified data part.

3. The speech recognition apparatus according to claim 2, wherein the speech recognition unit comprises:
means for calculating the speaking length of speech data to be subject to the speech recognition process and for recognizing a classification corresponding to the calculated speaking length; and
means for implementing the speech recognition process of the speech data by using acoustic models corresponding to the recognized classification.

4. The speech recognition apparatus according to claim 1, wherein the speech recognition unit further comprises means for recognizing the predetermined part in a speaking section indicated by the speaking length of speech data subject to the speech recognition process, and
when implementing the speech recognition process of the speech data, the speech recognition unit further uses acoustic models corresponding to the recognized predetermined part.

5. The speech recognition apparatus according to claim 1, wherein the model learning unit recognizes a length of a speaking section in speech data having power more than a threshold, as the speaking length.

6. The speech recognition apparatus according to claim 1, wherein the model learning unit classifies the speaking length into less than one second, a range of one second to less than three seconds, and at least three seconds.

7. The speech recognition apparatus according to claim 1, wherein the model learning unit recognizes the predetermined part in a speaking section based on time elapsed from a head of the speaking section.

8. The speech recognition apparatus according to claim 7, wherein the model learning unit applis a combination of a least two selected from among a one-second time period beginning with the head at the speaking section, a one-second end time period of the speaking section, and a central time period sandwiched between the two time periods, as the predetermined part in the speaking section.

9. A non-transitory computer-readable recording medium that stores a program causing a computer to function as a speech recognition apparatus which comprises:
  a speech recognition unit implementing a speech recognition process by using acoustic models about a set of phonemes and language models about a chain probability of a word group consisting of the set of phonemes; and
  a model learning unit that (1) classifies speaking sections included in speech data according to lengths of the speaking sections, (2) classifies detailed data parts corresponding to predetermined parts in each of the classified speaking sections according to start time of the predetermined parts, and (3) learns the acoustic models and the language models by using the classified detailed data parts specified both of the lenghs of the speaking sections and the start time of the predetermined parts.

10. A speech recognition method carried out by a speech recognition apparatus, comprising steps of:
  classifying speaking sections included in speech data according to lengths of the speaking sections;
  classifying detailed data parts corresponding to predetermined parts in each of the classified speaking sections according to start time of the predetermined parts;
  learning acoustic models about a set of phonemes and language models about a chain probability of a word group consisting of the set of phonemes by using the classified detailed data parts specified both of the lengths of the speaking sections and the start time of the predetermined parts; and
  implementing a speech recognition process by using the learned acoustic models and language models.

11. The speech recognition method according to claim 10, wherein when learning the acoustic models, the speech recognition apparatus detects the speaking section in speech data, generates a section information which indicates the detected speaking section, recognizes a data part corresponding to section information in the speech data as well as text data written from the speech data, classifies the recognized data part based on the speaking length thereof, and learns acoustic models by using the classified data part.

12. The speech recognition method according to claim 11, wherein when implementing speech recognition process, the speech recognition apparatus calculates the speaking length of speech data to he subject to the speech recognition process, recognizes a classification corresponding to the calculated speaking length, and implements the speech recognition process of the speech data by using acoustic models corresponding to the recognized classification.

13. The speech recognition method according to claim 10, wherein, when implementing speech recognition process, the speech recognition apparatus further recognizes a predetermined part in a speaking section indicated by the speaking length of speech data subject to the speech recognition process, and
  when implementing speech recognition process of the speech data the speech recognition apparatus further uses acoustic models corresponding to the recognized predetermined part.

14. The speech recognition method according to claim 10, wherein when learning acoustic models, the speech recognition apparatus recognizes a length of a speaking section in speech data having power more than a threshold, as the speaking length.

15. The speech recognition method according to claim 10, wherein when learning acoustic models, the speech recognition apparatus classifies the speaking length into less than one second, a range of one second to less than three seconds, and at least three seconds.

16. The speech recognition method according to claim 10, wherein when learning acoustic models, the speech recognition apparatus recognizes the predetermined part in a speaking section based on time elapsed from a head of the speaking section.

17. The speech recognition method according to claim 16, wherein when learning acoustic models, the speech recognition apparatus applies a combination of least two selected from among a one-second time period beginnings with the head of the speaking section, a one-second end time period of the speaking section, and a central time period sandwiched between the two time periods, as the predetermined part in the speaking section.

* * * * *

UNITED STATES PATENT AND TRADEMARK OFFICE
CERTIFICATE OF CORRECTION

PATENT NO. : 8,706,487 B2  Page 1 of 1
APPLICATION NO. : 12/518075
DATED : April 22, 2014
INVENTOR(S) : Emori et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1235 days.

Signed and Sealed this

Twenty-ninth Day of September, 2015

Michelle K. Lee
*Director of the United States Patent and Trademark Office*